March 26, 1957 D. E. GOLAY 2,786,445
VACUUMIZED LINE MILK RELEASER AND WASHER
Filed Nov. 2, 1955 3 Sheets-Sheet 1

INVENTOR
DONAVEN E. GOLAY
By Herbert A. Minturn
ATTORNEY

March 26, 1957 D. E. GOLAY 2,786,445
VACUUMIZED LINE MILK RELEASER AND WASHER
Filed Nov. 2, 1955 3 Sheets-Sheet 2

INVENTOR
DONAVEN E. GOLAY
BY Herbert A. Winturn
ATTORNEY

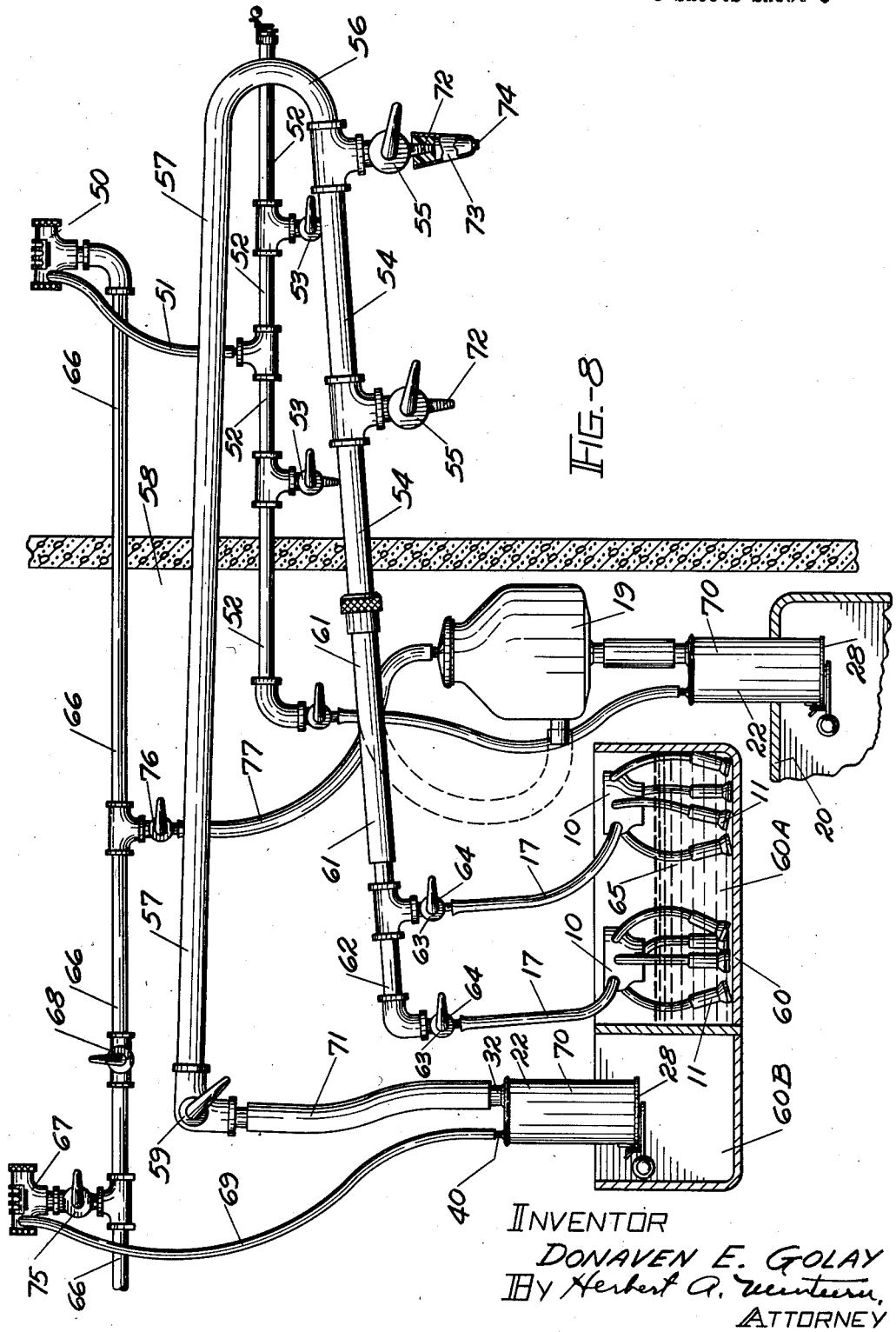

United States Patent Office 2,786,445
Patented Mar. 26, 1957

2,786,445
VACUUMIZED LINE MILK RELEASER AND WASHER

Donaven E. Golay, Cambridge City, Ind., assignor to Farmer Feeder Company, Inc., Cambridge City, Ind.

Application November 2, 1955, Serial No. 544,491

7 Claims. (Cl. 119—14.07)

This invention relates to means for withdrawing milk from a pipe line in a dairy without interrupting or causing interfering pulsations in the vacuum line employed to operate milking machines. The invention comprises essentially the combination of a milk receiving receptacle held under the desired degree of vacuum, and from which milk is drained intermittently through a releasing unit which is pulsated alternately from the vacuum pressure of the line and atmospheric pressure while the vacuum pressure of the line is held on the receptacle itself.

A primary object of the invention is to provide an exceedingly simple structure which will not only be operable over long periods of time, but also will be sanitary in that it may be readily demounted and cleaned and sterilized between uses. A further advantage of the invention resides in the fact that the milk may be handled gently without undue agitation, and particularly without churning action so that there is no tendency to separate the butterfat from the milk.

Heretofore it has been a customary practice to milk cows by machines operated from a vacuum line, wherein a pulsator operated to apply the vacuum and atmospheric pressure alternately and intermittently at a milking machine to transmit the varying pressures to the teat cups applied to the individual cow. Milk taken from the cups would pass through the milking unit and be discharged into a pail or even under some systems directly into a milk can. Then either the pail or the milk can had to be transported to a milk room when the milk would either be filtered into another container, or placed directly into a cooler to remove the body heat from the milk and carry the temperature of the milk down to a safe storing temperature until the individual cans would be picked up by a milk hauler and taken to a processing and bottling plant.

In recent years, there has been rising in favor of a slightly different system wherein the cows would be milked by a pulsating mechanism actuated from a vacuum line, and the milk carried from the teat cups through a claw directly into a pipe line which extends from the milking room into the milk handling room to be discharged into a bulk storage tank whereby the milk does not have to be placed in individual cans or pails, and further handling of the milk is dispensed with. That is, the milk is taken directly from the cow and piped into the bulk tanks where it is cooled and held for delivery.

One of the problems however confronting the industry in employing this last system where the milk is handled directly through a pipe line from the milking machine to the bulk storage tank has been the problem of removing the milk from the line without disturbing the constant degree of vacuum pulsations to be maintained in the vacuum line which operates the milking machine itself. Any variation in that degree of vacuum in the line would affect adversely the operation of the milking machine.

The present invention solves that problem very simply and readily in an exceedingly simple manner.

While reference has been made to delivering the milk into a bulk storage tank, the same system may deliver the milk into cans one after another where these cans remain in the milk room removed from the room wherein the cows stand while milking.

The invention further solves another problem, namely the problem of washing the milk flow line where the milk is carried from the milking room to the milk room to be discharged either in a bulk storage tank or in individual milk cans as may be desired. By use of this invention, the milk flow line may be left intact in position and does not have to be demounted after every milking period. In this case, the unloader mechanism operates as a pump to carry the washing fluid through the line to set up an agitation within the line aiding in removing the film of milk from the inside of the line.

The structure solving the problems is herein described in reference to the accompanying drawings, in which:

Fig. 8 is a diagrammatic representation of a modified milking system and also a washing system embodying the invention.

Figure 1:
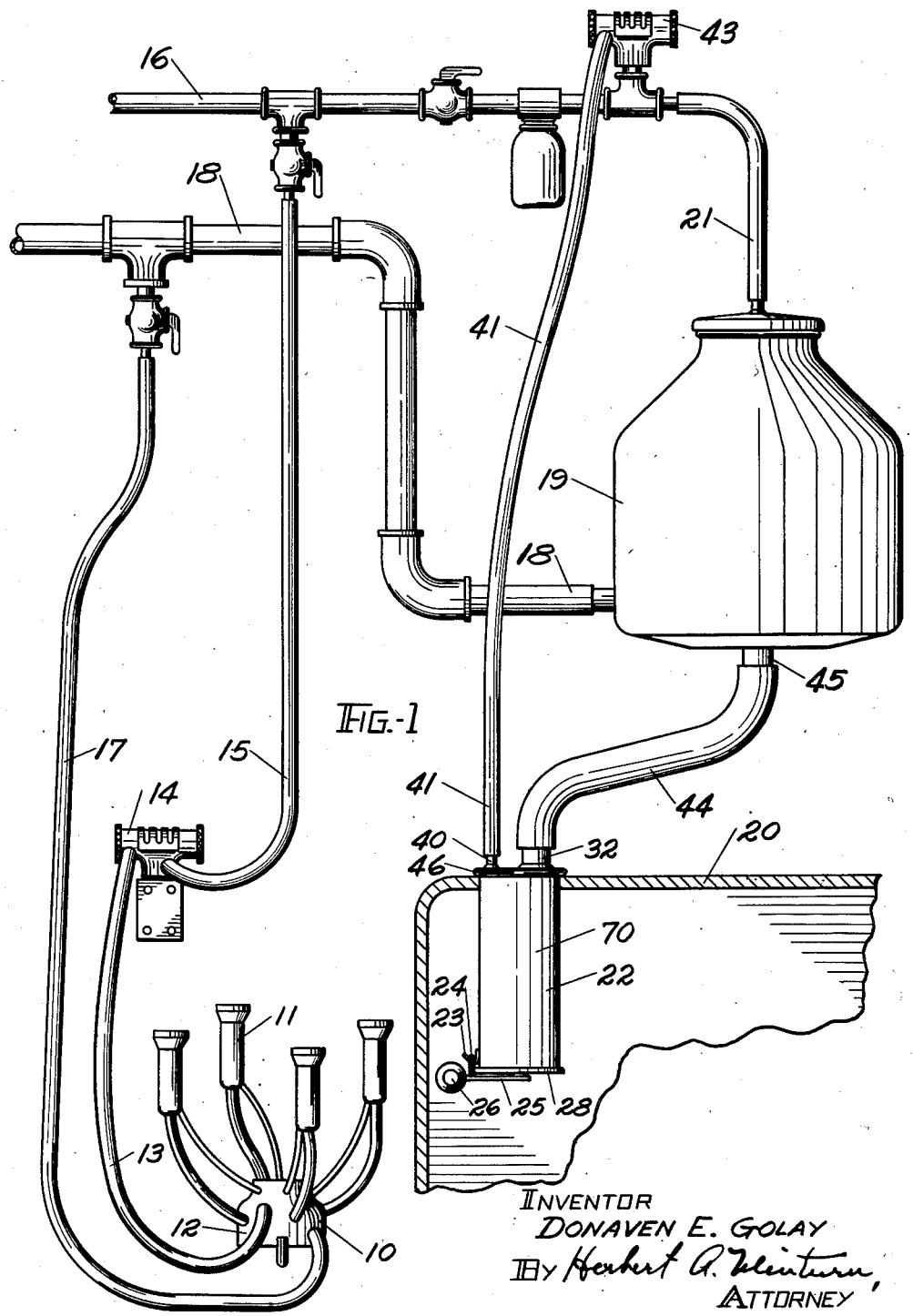
Fig. 1 is a diagrammatic representation of a system embodying the invention.
Figure 3:
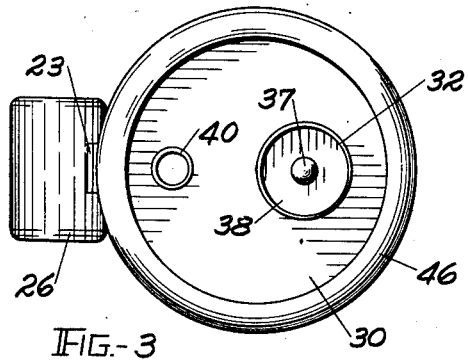
Fig. 3 is a view in top plan of the releasing unit.
Figure 4:
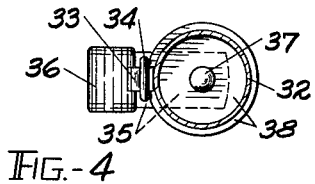
Fig. 4 is a view in detail and section on the line 4—4 in Fig. 2.

Referring to Fig. 1, a single milking unit designated generally by the numeral 10 embodies the four usual teat cups 11, and the claw 12. The claw 12 is interconnected through a flexible line 13 to a pulsating unit 14.

The pulsating unit 14 is not herein shown in detail since its structure and its operation is well known to those versed in the art, and pulsators may be obtained readily commercially in the market. It is sufficient to describe the pulsator 14 as being of the usual type wherein it will operate by connection through a flexible tube 15 from a vacuum line 16 to alternately evacuate the line 13 and then admit atmospheric pressure in continuous sequence.

With different milking units, different degrees of vacuum may be employed. The present structure will operate very successfully at a comparatively low vacuum such as a vacuum of ten inches of water. As above indicated, the vacuum line 16 is evacuated to the desired degree such as the ten inches of water by any suitable means such as by a vacuum pump (not herein shown).

The outlet of the claw 12 is connected through a flexible tube 17 to a milk line 18. This milk line 18 is carried into the milk handling room to discharge at the lower end of a milk receiving receptacle 19 which is placed at an elevation above a bulk storage tank 20.

In order to induce flow of milk through the line 18 from the milking unit 10, the milk receptacle 19 is interconnected with the vacuum line 16 through the flexible tube 21 whereby receptacle 19 is held at a constant degree of vacuum such as pertaining to the water height as previously mentioned. The milk line 18 is entered near the floor of the milk receptacle 19 so that the milk does not drop down and be subjected to splashing or impacts which would otherwise tend to separate some butterfat at least from the milk.

Referring to Figs. 2–7 inclusive, a milk releasing unit is formed to have a tubular body 22 of suitable dimensions depending upon the amount of milk to be handled and the time within that amount is to be discharged from the milk line 18. A suitable proportion of the tube 22 may be around four inches in diameter with a length ranging from twelve to fourteen inches, although this proportion is not a limitation of the invention in any respect, but is given merely to illustrate the relative size of the unit. These dimensions may be increased or decreased depending as has been indicated upon the amount of milk to be handled.

On the side of the tube 22 near its lower end there is fixed a hook member 23. Over this hook member 23 is freely engaged a bail 24 which is secured to an arm 25. On one end of the arm 25 is fixed a counterweight 26, and on the other end of the arm 25 and extending upwardly therefrom is a button 27.

Figure 7:
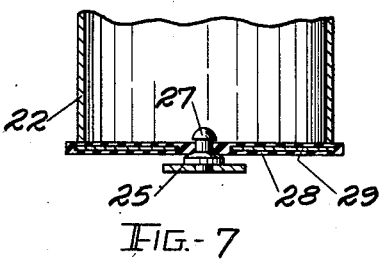
Fig. 7 is a detail in vertical section through the base of the releaser unit on the line 7—7 in Fig. 2.

A tube lower enclosure cover plate 28 is provided to have a diameter exceeding the external diameter of the tube 22, and is preferably reenforced by an internally imbedded plate 29 Fig. 7. The button 27 detachably passes through the center of the cover 28 whereby the cover 28 may be readily removed from engagement with the arm 25 by slipping it off of the button 27. The entire assembly of the arm 25, bail 24, weight 26, button 27, and the cover 28 may be removed by slipping the bail 24 off of the hook 23 so that all of the parts may be readily cleaned as may be desired. Normally the weight 26 over-balances the weight of the arm 25 and the cover 28 so that the cover 28 is held against the lower end of the tube 22 in a closed position.

A rigid top cover plate 30 is given a diameter exceeding the external diameter of the tube 22, so that it may rest on the outturned annular flange 31 formed around the upper end of the tube 22. It is to be noted that the plate 30 generally made of metal rests directly upon the flange 31 which also may be made of metal. While these two parts are specified as being made of metal, it is obvious that they may be made out of any of the synthetic resins, or even made of glass if so desired. Metal however is entirely suitable and more readily worked, and is more durable.

A milk inlet tube 32 extends through the plate 30 to extend both above and therebelow. The external diameter of this tube 32 is made to be less than the internal diameter of the tube 22, and in fact may approach about half the internal diameter of the tube 22.

On the lower end of the tube 32, below the plate 30, there is fixed a hook 33 over which a bail 34 is freely positioned to carry an arm 35 normally extending across the underside of the tube 32, and spaced below that end. The arm 35 carries a counterbalance weight 36 on its end removed from the tube 32, and carries a button 37 on its inner end, turned upwardly to extend detachably through a resilient cover plate 38 having a diameter slightly exceeding the external diameter of the tube 32, this cover plate 38 being preferably reenforced by an internal rigid disc 39. Normally the weight 36 is sufficient to rock the arm 35 around through the bail 34 resting on the hook 33 to position the cover plate 38 against the under side of the tube 32. The assembly may be readily lifted off of the supporting hook 33 for cleaning purposes, and for removing the cover plate 38 from engagement over the button 37.

The plate 30 also carries a second tube 40 of a smaller diameter than that of the tube 32 and this tube 40 is interconnected through a flexible tube 41 with the pulsator 43 which is interconnected with the vacuum line 16 in such manner that the pulsator 43 will operate in the usual manner to set up an alternate degree of vacuum in the line 41 and atmospheric pressure. The upper end of the tube 32 extending from the top side of the plate 30 is interconnected through the tube 44 with the outlet fitting 45 in the floor of the milk receptacle 19. The entire milk releaser assembly carried by the tube 22 is preferably inserted downwardly through the top of the milk storage tank 20 and allowed to hang there.

In operation, with the milking unit 10 operating and delivering milk into the line 18 under the influence of the vacuum in the milk receptacle 19, milk will tend to accumulate in that receptacle 19. However, the releaser tube 22 is also being subjected intermittently to the same degree of vacuum and also in addition atmospheric pressure. When the pulsator 43 is in that stage of operation wherein the line 41 is vacuumized, the interior of the tube 22 will likewise be vacuumized, thereby tending to hold the cover plate 28 snugly up against the lower end of the tube 22, and the cover plate 28 further snugly against the button 27 so that there is no tendency for atmospheric air to leak into the lower end of the tube 22. With the tube 22 thus vacuumized, the cover plate 38 at the lower end of the tube 32 is free to drop away from the lower end of the tube 32 by reason of the weight of the milk thereon as flowing from the milk receptacle 19, and there is no interchange of pressures between the tube 22 and the milk receptacle 19 by reason of the fact that the tube 22 is at that instant under the same vacuum pressure as is the milk receptacle 19.

Figure 2:
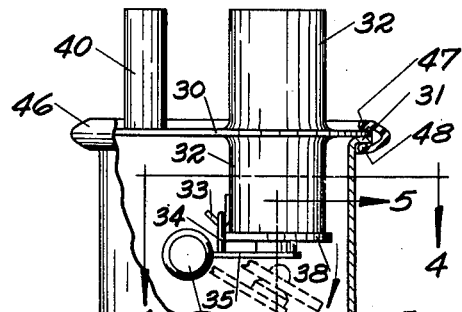
Fig. 2 is a view in side elevation and partial section of a milk releasing unit.
Figure 5:
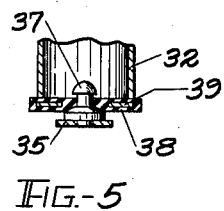
Fig. 5 is a detail in vertical section on the line 5—5 in Fig. 2.
Figure 6:
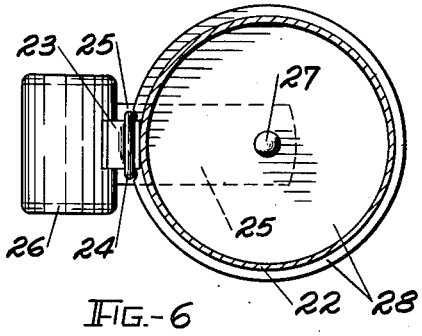
Fig. 6 is a detail in transverse section through the releaser unit on the line 6—6 in Fig. 2.

When the pulsator 43 continues to its atmospheric pressure stage and the tube 41 is then brought up to the atmospheric pressure, vacuum in the milk receptacle 19 will tend to hold the cover plate 38 closed and the weight of the milk in the tube 22 will cause the larger diameter cover plate 28 at the lower end of the tube 22 to drop downwardly to some such position as indicated by the dash lines, Fig. 2, and thereby dump the milk into the storage tank 20. However, as soon as that milk has been dumped, the weight 26 will tend to return the cover plate 28 to its original closed position across the lower end of the tube 22, so that the intermittent action may then continue alternately dumping milk from the milk receptacle 19 into the tube 22 and then dumping milk from the tube 22 into the storage tank 20 while at the same time there is no change in pressure between the tube 22 and the milk receptacle 19 at the time the cover plate 38 drops open under the weight of the milk. Of course the cover plate 38 will return to its closed position immediately when the counterbalance 36 overcomes the weight of the milk flowing thereagainst if there still be any, and pressure is applied to the tube 22 above the vacuum in the milk receptacle 19.

In respect to the sealing of the plate 30 against the flange 31 of the tube 22, this may be done in any number of ways but is herein shown as being accomplished by means of the use of a retaining ring 46 made out of a rubber-like material and having an annular groove around its inner side to receive the peripheral portions of the plate 30 and the flange 31 as indicated in Fig. 2. The retainer ring 46 is of sufficient elasticity so that it may be stretched outwardly to permit the plate 30 to be removed from contact with the flange 31, and also in the reverse be mounted thereon and held in position. By reason of the contact of the lips 47 and 48 of the retainer ring 46 respectively against the top side of the plate 30 and the under side of the flange 31, there is no leakage of atmospheric air into the tube 22 when the tube is vacuumized. In fact the lips tend to be drawn snugly against those surfaces during the vacuumizing step.

A modified form of the milking system is presented more or less diagrammatically in Fig. 8 of the drawings. In this arrangement, a single pulsator 50 is employed on a line leading directly from the vacuum pump (not shown) and this pulsator 50 is connected through a tube or pipe 51 with the vacuum line which is present at the position of milking the cows. This vacuum line, designated by the numeral 52 will extend along the stanchions or the individual stalls wherein the cows are milked, and have the stop cocks 53 spaced therealong and in numbers as may be required. The pulsator 50 operates in the usual manner to alternately vacuumize the line 52 in a constant timing wherein the line 52 is alternately reduced below atmospheric pressure to the desired degree of vacuum such as around ten inches of water, and raised to atmospheric pressure, this pulsation being available at each and all of the stop cocks 53.

A milk receiving line 54 preferably made out of glass, although metal can be employed, is provided with milk inlet stop cocks 55, one for each position or stall or stanchion of the cow to be milked. This milk line 54 is carried through a U bend 56 around into an upper line 57, both the lower and upper lines going to the milk room generally designated by the numeral 58.

In the normal milking procedure, the hose or tube 17 leading from the claw 10 is connected to the stop cock 55 and the pulsating pressure line or tube 13 is interconnected with one of the vacuum line stop cocks 53. No pulsator 14 as indicated in Fig. 1 is necessary at the position of milking since the single pulsator 50 takes care of the entire vacuum line 52 and all of the milking units being employed and connected to the milk line 54. The upper flight of the line, 57, is closed off during the milking operation by any suitable means such as by the stop cock 59 in the end of the line in the milk room 58. The lower downwardly inclined pipe 54 comes into the milk room 58, and may be either directed through a suitable hose or pipe line into a milk receptacle 19, or into individual cans maintained or held in that room, and later placed in a suitable refrigerator. The important distinction in this particular form of setup is that but a single pulsator 50 is employed in this manner, each cow is subjected to the same single pulsator 50 action each time she is milked rather than being subjected by chance to a different pulsator 14 at consecutive milkings. A cow is adversely sensitive to varying rates of milking.

The washing of the milk flow line, as above indicated, is one of the great problems in handling milk through a flow line from the milking parlor, stanchion, or wherever the cow may be milked. By use of the system to be described, the milk line may remain in place without having to be dismounted at the end of each milking period.

In the milk room 58, there is a wash tank 60 preferably divided into two compartments, the compartment 60A holding the washing solution, and the compartment 60B being the washing solution receiving compartment after it has been used to wash the line.

In the washing operation, the milk flow line 54 is interconnected through any suitable means such as by a tube or hose 61 to a fixed line 62 from which lead one or more hose connectors 63, herein shown as having a stop cock 64 in each of the two connectors included in the diagram. There may be but one of these cocks or there may be more than two depending upon the number of milking units employed. In any event, the milk tube 17 from the claw 10 is in each instance connected to the stop cock 64 and the teat cups are allowed to hang downwardly in the solution 65. Each stop cock 64 is opened one at a time or all of them open simultaneously. To the line 66, which leads to the pulsator 50 from the vacuum pump, there is connected a second pulsator 67 which may be cut off from the line 66 at will, and also the line 66 may be cut off between the pulsator 67 and the pulsator 50 by any suitable means such as by the stop cock 68. The pulsator 67 operates to set up the same pulsating action intermittently producing a vacuum in a tube 69 which leads from the pulsator 67 downwardly to connect with the tube 40 of the unloader as illustrated in Figs. 3–7 in the drawings, to which may be given the general numeral of 70 to designate it as a whole. This unit 70 is suspended in any suitable manner over the tank compartment 60B. A tube 71 leads and connects from the stop cock 59 at the end of the line 57 with the tube 32 of the unit 70. The line 57 is inclined upwardly from the bend 56 whereas the line 54 is inclined downwardly therefrom so that drainage is had from the stop cock 59 downwardly to the outlet of the pipe 54 in the milk room 58. In this connection, with the stop cock 59 open and the stop cock or cocks 64 open, the unit 70 will be vacuumized to in turn induce a vacuum in the line 57 and the line 54. This means that the washing solution 65 in the compartment 60A will be elevated and carried through the pipe line 54, around the bend 56 and around through the flight 57 to come into the tube 71 and discharge into the cylinder 22 while the lower flapper valve 28 remains closed for an initial period. On each of the milk flow stop cocks 55, the flow line hose 17 having been removed, there is positioned a tube 73, preferably made out of glass, to slip over the nipple 72 of the stop cock fitting 55. In the lower end of the tube 73 there is provided a small hole 74. This hole permits entrance of air in small volumes into the milk line 54, the tube 73 of course filling up with the washing solution, and this air bubbles up through that washing solution and the bubbles are carried up into the line 54 and therearound into the line 57 setting up a turbulence aiding greatly in removing the milk film from the inner wall of the line. The stop cocks 55 are of course opened during this washing out operation after the tubes 73 have been attached, one at each of the stop cocks 55 along the line 54.

Then when the tank 22 of the unit 70 receives a sufficient amount of the washing fluid to cause the valve 28 to drop downwardly and dump the fluid into the compartment 60B, the valve 28, being biased toward the closed position by the weight 26, Fig. 2, will close and the vacuum produced will hold the valve in the closed position through the next pulsating cycle step thus intermittently dumping the washing fluid all in the manner as above described in relation to the device 70 being utilized in unloading the milk line for the flow of milk.

Since the line 54 and its return 57 in this washing operation is made out of glass, the cleanliness thereof may be readily determined at any time, and when clean, the washing solution may be stopped in its flow therethrough by stopping the pulsator 67 such as by the stop cock 75, or any other desired means, whereupon the line 57 may drain by flowing around through the line 54 into the wash tank. However, it is preferred that all of the solution provided in the compartment 60A will be drawn through the line so that in the end, the line is substantially free of solution when the washing operation is intended to be complete. The hose 61 as above indicated may be alternately connected with the line 62 or with the bulk storage tank or with the cans to be filled when the line 54 is being employed in the usual milking operation.

When this system is to be used in the milking operation, there will be a line 77 running from a stop cock 76 in the line 66 to the milk receiving unit such as the milk can, or other vessel to which the milk is to be flowed, such as the receptacle 19, which is unloaded by the device 70 as previously described.

This line 77 therefore vacuumizes the receiving receptacle in order to lift the milk from the teat cups into the line 54 to set up the flow to the receptacle. The receptacle being interconnected through a hose such as the hose 61 with the line 54 will of course communicate that pressure induced below atmospheric in the receptacle 19 to the line 54.

Therefore, it is to be seen that I have produced an exceedingly simple, but most effective device for the purpose intended, and while I have shown and described the device in the one particular form, it is obvious that structural changes may be employed without departing from the spirit of the invention, and I therefore do not desire to be limited to that precise structure beyond the limitations which may be imposed by the following claims.

I claim:

1. In a milking and milk storage system having a vacuum line and a milk flow line moving milk therealong under vacuum from the vacuum line, a releaser of milk from said milk line comprising a vessel having a top milk inlet opening and a bottom milk discharge opening; a valve member normally biased to close said bottom opening and opening in the direction of discharge flow through the bottom opening; a second valve member located within said vessel and normally biased to close said inlet opening and opening in the direction of milk flow into the vessel; a line interconnecting with said milk flow line and said inlet opening; a line interconnecting with said vacuum line and the upper end portion of said vessel; and means intermittently varying pressure in said vacuum interconnecting line between the vacuum pressure of said vacuum line and atmospheric pressure; said bottom valve member operating to a closed condition upon said vessel being subjected to a partial vacuum and allowing milk by its weight to open the inlet valve member and discharge milk into the vessel, and, when the vessel is subjected to atmospheric pressure, the inlet valve member operating to a closed condition by reason of the differential in pressures on each side of that valve member and allowing the bottom valve member to open under the weight of milk then in the vessel.

2. The structure of claim 1 in which a milk receptacle is interposed between said milk flow interconnecting line and said releaser inlet opening and is located above said releaser to discharge said vessel by gravity, and a vacuum line interconnecting with said receptacle, said receptacle collecting milk from said line and discharging milk therefrom by gravity into said vessel upon said inlet valve member opening.

3. For unloading a milk line under vacuum, a releaser comprising a vertically elongated vessel open across both top and bottom ends; a valve plate covering the bottom end; an arm under and carrying the plate; a bail carried by the plate outside of said vessel; a hook on the vessel over which said bail is freely engaged; a counterweight on the outer end of said arm removed from said bail and said plate; a cover fitting over the top end of said vessel; a milk inlet tube carried by and discharging by a lower end opening through the cover; a valve plate hingedly carried by said cover and swinging to move upwardly to cover over said milk inlet opening; a counterweight normally moving the last named valve plate to its covering position; a pressure line connection carried by said cover opening into said vessel; means hermetically sealing said cover with said vessel; and a pulsator connected to said connection operating to vary in sequence pressure in said vessel from atmospheric to a predetermined degree of vacuum.

4. The structure of claim 3 in which said milk inlet tube extends below said cover, said valve plate covering the opening thereof being swung by a bail from the side of said tube extension, and said bail is fixed to an arm carrying said inlet opening covering plate.

5. The structure of claim 4 in which each said valve plate arms carries an upwardly extending button centrally and demountably piercing the respective valve plates, and each of said plates are elastic.

6. For unloading a milk line under vacuum, a releaser comprising a vertically disposed vessel having top and bottom openings; a top cover member fitting over said top openings; means sealably interconnecting said cover member and said vessel; an alternating vacuum-atmospheric pressure line connection through said cover member; a milk flow line connection from said milk line through said cover member; a valve member carried by said cover member and controlling flow of milk from said flow line connection into said vessel; means normally biasing said valve member into a milk flow cut-off position; a second valve member carried by said vessel for closing and opening said vessel bottom opening; and means biasing said second valve member to a closed opening position; said first valve member opening under weight of milk thereagainst upon said vessel reaching a predetermined degree of vacuum to overcome its biasing means effected through said vacuum-atmospheric pressure line connection and closing upon atmospheric pressure in the vessel being had; said second valve opening upon sufficient weight of milk thereover being had to overcome the second valve biasing means.

7. A vacuumized milk receptacle unloader comprising a vertically disposed tube open across both its top and bottom ends both disposed in substantially parallel and horizontally disposed planes; a tube cover removably resting across said tube top end; a flange radially outturned from said tube top end and the peripheral portion of said cover being approximately coextensive with said flange; an elastic ring having an entering groove therearound encircling and receiving said cover portion and said flange therein effecting a pressure seal therebetween; an alternating atmospheric-subatmospheric pressure carrying tube carried by and opening through said cover; a milk receptacle connecting tube carried by and opening through said cover; an arm freely hinged within said vertical tube on a horizontal axis to swing across said milk tube opening; a weight carried by the arm biasing the arm to swing upwardly against said milk tube opening; an elastic valve member over said arm and detachably carried thereby; said valve member fitting over said milk tube opening; an arm carried externally of and by said vertical tube swingable on a horizontal axis upwardly across said tube bottom end; a weight on said arm biasing the arm to swing toward said vertical tube end; and an elastic valve member detachably fitting over said last arm and closing said tube bottom end; said biasing weight in each instance being overcome upon sufficient milk weight on the respective valve members to allow them to rock open in sequence upon said vertical tube being subjected to subatmospheric and atmospheric pressures.

References Cited in the file of this patent

UNITED STATES PATENTS

| | | |
|---|---|---|
| 2,624,355 | Buchinger | Jan. 6, 1953 |
| 2,625,133 | Hein | Jan. 13, 1953 |
| 2,630,783 | Reeve | Mar. 10, 1953 |
| 2,696,193 | Domingo | Dec. 7, 1954 |
| 2,703,067 | Carson | Mar. 1, 1955 |
| 2,708,448 | Reeve | May 17, 1955 |